Sept. 30, 1952  E. W. FLOSDORF ET AL  2,612,338
QUICK-ACTING GEAR ACTUATED PIVOTED VALVE
Filed June 27, 1950  3 Sheets—Sheet 1

INVENTORS
EARL W. FLOSDORF.
LEWIS H. HULL.

BY Adams, Forward and McLean

ATTORNEY

Sept. 30, 1952  E. W. FLOSDORF ET AL  2,612,338
QUICK-ACTING GEAR ACTUATED PIVOTED VALVE
Filed June 27, 1950  3 Sheets-Sheet 2

INVENTORS
EARL W. FLOSDORF.
LEWIS H. HULL.

BY Adams, Forward and McLean
ATTORNEY

Sept. 30, 1952     E. W. FLOSDORF ET AL     2,612,338
QUICK-ACTING GEAR ACTUATED PIVOTED VALVE
Filed June 27, 1950     3 Sheets—Sheet 3

INVENTORS
EARL W. FLOSDORF.
LEWIS H. HULL.

BY Adams, Forward and McLean
ATTORNEY

Patented Sept. 30, 1952

2,612,338

UNITED STATES PATENT OFFICE 2,612,338

QUICK-ACTING GEAR ACTUATED PIVOTED VALVE

Earl W. Flosdorf, Forest Grove, and Lewis W. Hull, Huntingdon Valley, Pa., assignors to F. J. Stokes Machine Company, Philadelphia, Pa., a corporation of Pennsylvania Application June 27, 1950, Serial No. 170,538

2 Claims. (Cl. 251—16)

This invention relates to valves. More particularly this invention pertains to a disc type high vacuum valve that is safe and easy to operate between a full open position and a full closed position.

The valve of the present invention is designed to provide rapid opening and closing combined with high vacuum tightness. When closed the valve is fluid tight and the vacuum may exist on either side of the valve.

The operating means of the present invention includes a worm gear drive which enables the operator to safely open the valve while under high vacuum since the worm and worm gear arrangement prevents any rapid movement of the valve disc from being transmitted to the operating hand wheel. The operator is, therefore, protected from serious injury and is able to use both hands, if necessary, for the initial opening rotation and final closing rotation of the operating hand wheel.

The present invention involves a worm gear operating means which winds up or cocks a resilient connecting means located between a worm gear shaft and a valve disc during initial opening rotation of the shaft. Since the initial unseating of the valve disc from the valve seat requires a great force, pusher means having a high mechanical advantage are included for operation at this stage. The pusher means cause the valve disc to be moved away from the valve seat during substantial maintenance of parallelism between disc and seat. The valve disc is moved, therefore, from a full closed position to a partially open position by the pusher means. Immediately upon being freed from the valve seat by movement to the partially open position the valve plate is rotated to an open position by the cocked resilient connecting means. If a high vacuum is present, this rotational movement may be tremendously accelerated. Prior art devices have proved extremely dangerous when acted on by high vacuum at this point of valve operation, because the violent movement is transmitted to the hand operating mechanism, thereby exposing the operator to grave bodily harm. The present invention obviates this dangerous disadvantage of the prior art by a new and novel valve operating mechanism. On closing the valve, the torque of the shaft is transmitted to the valve disc through the resilient connecting means to rotate the valve disc into parallelism with the valve seat. At this point the pusher means cause the valve plate to move in a translational manner from the partially closed position to the full closed position. This invention, therefore, includes a pusher means which, in combination with the worm gear operating means, provides a tremendous final seating force and a tremendous initial unseating force with little effort on the part of the operator.

The various objects and features of our invention will be fully understood from the following detailed description of a typical preferred form and application of our invention, throughout which description reference is made to the accompanying drawings, in which.

Figure 1:
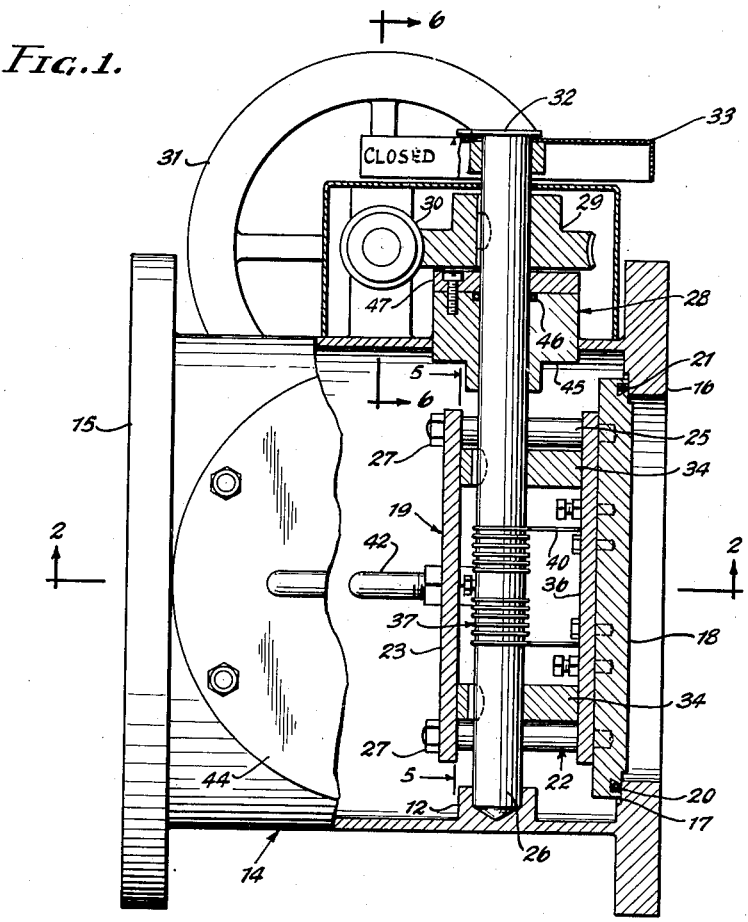
Fig. 1 is a top view of the valve with a portion of the cover plate and valve body broken away showing the valve in full closed position.
Figure 6:
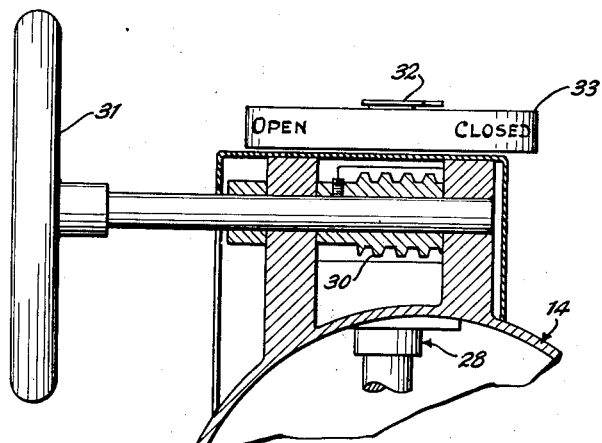
Fig. 6 is a fragmentary end view taken on line 6—6 in Fig. 1.
Figure 5:
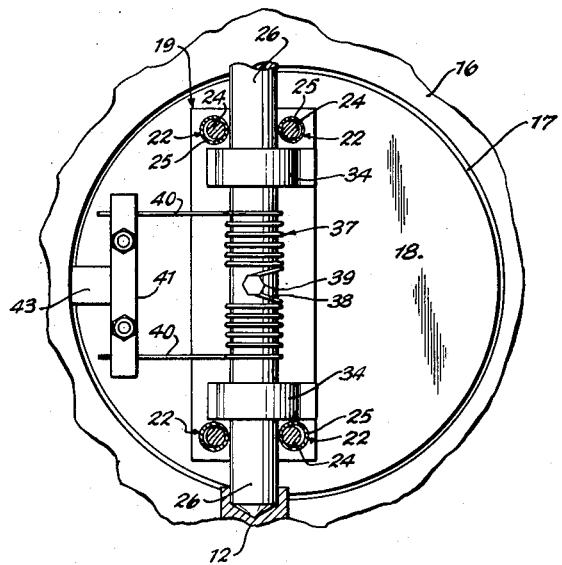
Fig. 5 is a fragmentary end view taken on line 5—5 in Fig. 1.

As seen in the drawings the preferred embodiment of this invention comprises a valve body 14 having flanges 15 and 16 which are adapted to be connected to a high vacuum line in the normal manner. On the inner face of flange 16 is an annular valve seat 17 which is engaged by the valve plate 18 of the valve plate assembly 19. The valve plate or disc 18 is preferably provided with an annular groove 20 in which is disposed an O ring 21. Included in the valve plate assembly 19 are four bearing posts 22 which extend from the valve plate 18 to the unseating pressure member 23. As seen in Fig. 5 the bearing posts 22 include threaded rods 24 and tubes 25 disposed thereon, the tubes serving the dual function of spacing the unseating pressure member 23 from the valve plate 18 and providing two pairs of oppositely disposed bearing surfaces for movement of the valve plate assembly 19 with respect to the shaft 26. Tightening nuts 27 on rods 24 provide means for clamping the tubes 25 in position between member 23 and valve plate 18. The shaft 26 is rotatably mounted in bearings 12 and 28 below the horizontal center line of valve seat 17 and has a worm gear 29 keyed thereto, the worm gear 29 being operatively engaged by the worm 30 which is powered by the hand wheel 31 as seen in Fig. 6. As seen in Fig. 1 only the bearing 28 requires a fluid sealing means; this sealing means consisting of a body bearing member 45, a lubricating and sealing ring 46, and a sealing cover 47. An indicator arrow 32 connected to the shaft 26 coacts with the indicia means 33 to designate the open and closed positions of the valve.

The cams 34 which act as pusher means are keyed to the shaft 26 for rotation therewith. Upon final closing rotation of shaft 26, the cams 34 wipe across the seating pressure member 36 which is a smooth surface portion on the valve plate 18. Upon initial opening rotation of shaft 26, the cams 34 wipe across the unseating pressure member 23. As will be explained hereinafter, the shape of the cams 34 is such as to cause movement of the valve plate assembly 19 in a horizontal and translational manner toward and away from the valve seat 17.

A spring 37 which serves as a resilient connection between the shaft 26 and the valve plate assembly 19, is coiled around the shaft 26 in opposite directions from the ends thereof to form a loop 38 in the middle portion which is secured to the shaft 26 by the bolt 39. The legs 40 of the operating spring 37 are fixedly connected to the outer portion of the valve plate 18 by a bolted clamp 41.

A stop finger 42 is connected to the valve plate assembly 19 for abutment with the assembly stop 43 upon full opening movement of the valve plate assembly.

A cover plate 44 is removably secured to the valve body 14 to allow easy access to the inside of the valve for maintenance and repairs.

Figure 2:
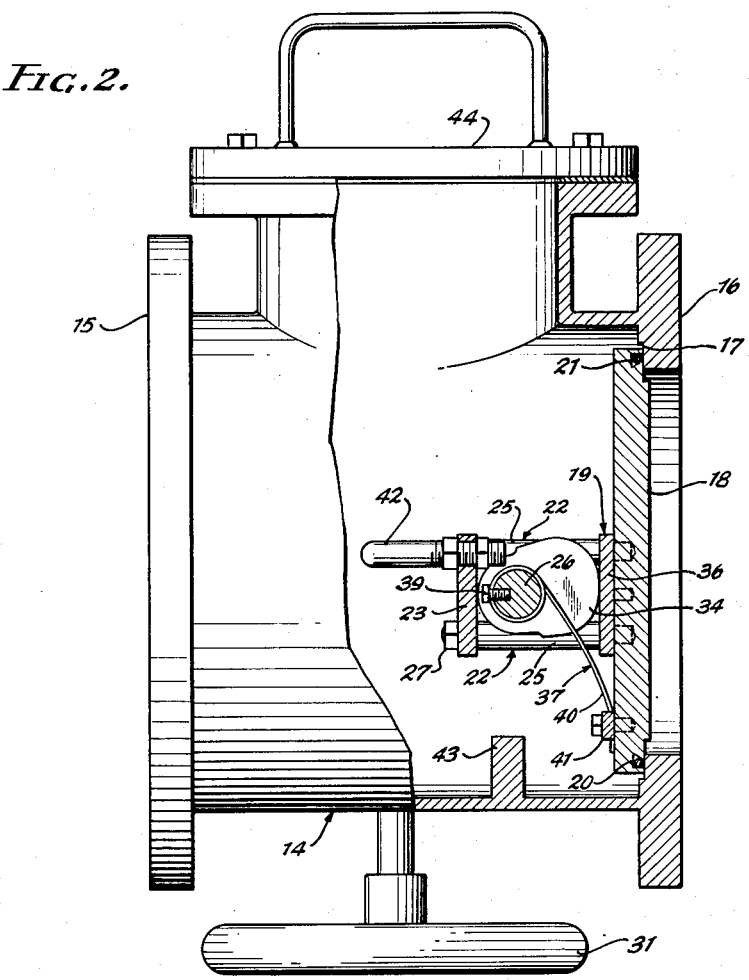
Fig. 2 is a side view partly broken away taken on line 2—2 in Fig. 1 and showing the valve in full closed position.
Figure 7:
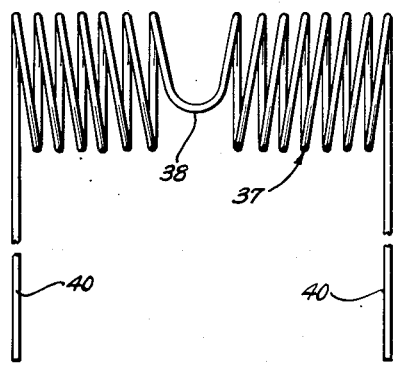
Fig. 7 is a view of the spring which comprises the resilient connecting means of the instant invention.
Figure 3:
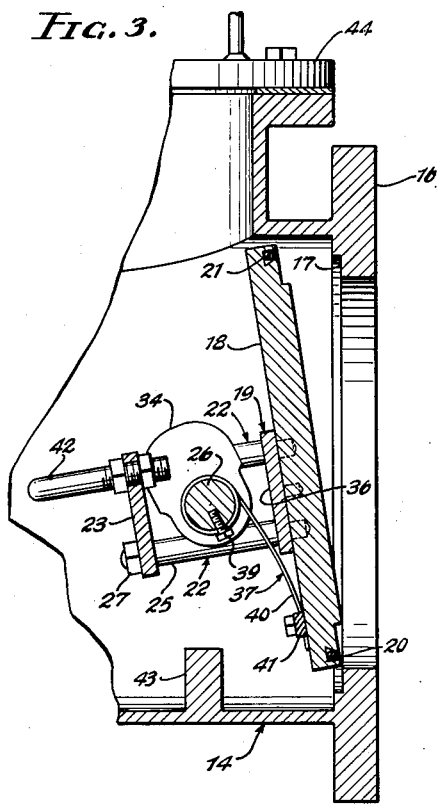
Fig. 3 is a view similar to Fig. 2 showing the valve in a slightly rotated position from a partially open position.
Figure 4:
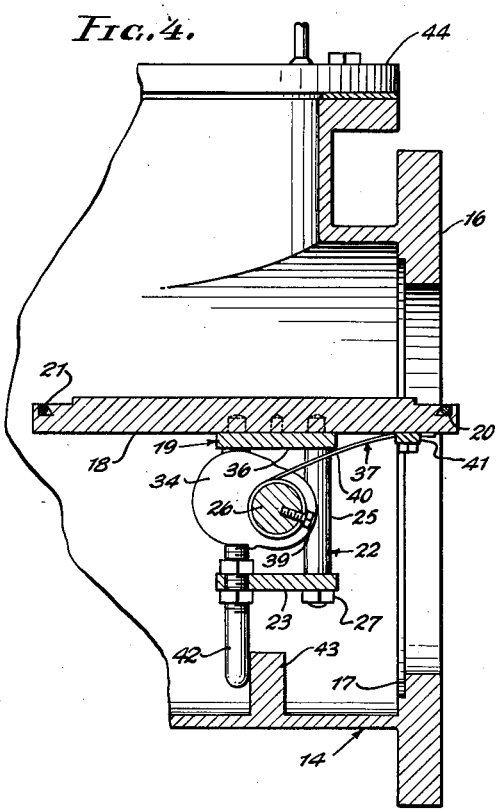
Fig. 4 is a view similar to Fig. 2 showing the valve in a full open position.

In the operation of the valve from a full closed position to a full open position, the shaft 26 is rotated counterclockwise by the hand wheel 31 as viewed in Figs. 2-4. The initial opening rotation of the shaft 26 rotates the cams 34 out of contact with the seating pressure member 36 and into contact with the unseating pressure member 23 and causes the cams 34 to wipe across the surface of the unseating pressure member 23, thereby pushing the valve plate assembly 19 away from the valve seat 17 in a translatory manner until free from adhesion thereto. The cams 34, therefore, push the assembly 19 from a full closed position to a partially open position. During the above explained initial opening rotation of the shaft 26, wherein the valve plate 18 is unseated, the spring 37 is wound up or cocked to a valve opening state. As soon as the valve plate assembly 19 has been slid to the partially open position the cocked spring 37 causes the assembly 19 to rotate to the full open position shown in Fig. 4. As seen in Fig. 3, the cams 34 slide the assembly 19 a sufficient distance to allow the unobstructed rotation of the assembly 19 by the spring 37. The stop finger 42 limits the counterclockwise rotation of the assembly 19 by abutting against the assembly stop 43. In the preferred embodiment shown in the drawing, the cams 34 must be rotated from their position in Fig. 3 to their position in Fig. 4 to insure full opening of the valve, this being evident by inspection of the indicating arrow 32. In the full open position shown in Fig. 4 the valve plate 18 is disposed horizontally and is substantially centrally located in the line of fluid flow.

In the operation of the valve from the full open position to the full closed position, the shaft 26 is rotated clockwise as viewed in Figs. 2-4. The rotation of the shaft 26 causes the spring 37 to be unwound a limited amount thereby stiffening the spring legs 40. Good torque transmission between the shaft 26 and the assembly 19 is thereby provided, and the assembly is rotated from the horizontal full open position to the vertical partially closed position. At this point the valve plate 18 is parallel to the valve seat 17 and the cams 34 are in contact with the seating pressure member 36 which is a raised smooth portion of the valve plate 18. Final closing rotation of the shaft 26 causes the cams 34 to wipe across the member 36 and slide the assembly 19 transversly across shaft 26 into a full closed position.

The worm gear drive and the shape of the cams 34 enable the operator of the valve to apply a tremendous translational force on the seating pressure member 36 whereby the valve plate 18 is slid from the partially closed position to the full closed position during substantial maintenance of parallelism between plate 18 and seat 17. Similarly, the operator of the valve may apply a tremendous horizontal force on the unseating pressure member 23 to slide the valve plate 18 from the seated or full closed position to the partially open position during substantial maintenance of parallelism between plate 18 and seat 17.

The bearing posts 22 are eccentrically constructed to allow periodic rotation of the tubes 25 with respect to the rods 24 so as to present a new bearing surface to the shaft 26. By this arrangement the life of the bearing tubes 25 is substantially prolonged and frictional bearing losses due to the translational and rotational movement of the valve plate assembly 19 on shaft 26 are substantially reduced.

By mounting the shaft 26 in the bearings 12 and 28, which are positioned below the horizontal center line of the valve seat 17, the valve plate assembly 19, when in the full open position, is substantially evenly distributed in the line of fluid flow. Preferably the valve housing is larger than the fluid line to insure a cross sectional area of sufficient size to inhibit turbulence, thereby maintaining the pressure drop across the valve at a minimum.

While we have described a typical preferred form and application of our invention, we do not wish to be limited or restricted to the specific details herein set forth, but wish to cover all changes and modifications which do not constitute departures from the spirit and scope of the invention.

We claim:

1. A hand operated valve for use in high vacuum lines comprising a valve body having a flat, vertically-disposed, annular valve seat therein; a shaft rotatably mounted in said valve body; coiled spring means affixed to and surrounding said shaft and having a pair of legs which extend transversely thereof; a valve plate assembly rigidly connected to said legs including a valve plate having an annular surface for engaging said valve seat, a seating pressure member integrally formed on said valve plate, spaced pairs of bearing posts extending from said valve plate transversely of and beyond said shaft on opposite sides thereof for guiding translational and rotational movement of said valve plate assembly, and an unseating pressure member connected to the ends of said bearing posts positioned beyond said shaft; a worm gear keyed to said shaft; a worm meshed with said gear for rotating said shaft, said spring means having sufficient stiffness to transmit the valve closing torque of said shaft through said leg means to said valve plate assembly for rotating said assembly substantially 90° from full open position to a partially closed position, said spring means having sufficient resiliency to store resilent power upon initial opening rotation of said shaft for rotating said valve plate mechanism from a partially open position to a fully open position; and cam means rigidly mounted on said shaft for wiping engagement with said seating pressure member upon final closing rotation of said shaft and for wiping engagement with said unseating pressure member upon initial opening rotation of said shaft, said cam means being formed to translate said valve plate assembly between a fully closed position and a partially open position upon final closing and initial opening rotation respectively of said shaft.

2. A valve for use in high vacuum lines in accordance with claim 1 and including a stop finger mounted on and extending from said valve plate assembly, and an assembly stop mounted on said valve body for abutment by said stop finger when said valve plate assembly reaches full open position.

EARL W. FLOSDORF.
LEWIS W. HULL.

REFERENCES CITED

The following references are of record in the file of this patent:

UNITED STATES PATENTS

| Number | Name | Date |
|---|---|---|
| 865,915 | Koch | Sept. 10, 1907 |
| 1,112,135 | Harkom | Sept. 29, 1914 |
| 1,669,119 | Bliss | May 8, 1928 |
| 2,051,881 | Mock | Aug. 25, 1936 |
| 2,094,222 | Smith | Sept. 28, 1937 |
| 2,530,295 | Fantz | Nov. 14, 1950 |